(No Model.) 4 Sheets—Sheet 2.

O. B. PECK.
CENTRIFUGAL ORE SEPARATOR.

No. 489,197. Patented Jan. 3, 1893.

Witnesses:
Chas E. Gaylord
Clifford R. White

Inventor:
Orrin B. Peck,
By Banning & Banning & Payson
Attys (No Model.) 4 Sheets—Sheet 3.
O. B. PECK.
CENTRIFUGAL ORE SEPARATOR.

No. 489,197. Patented Jan. 3, 1893.

(No Model.) 4 Sheets—Sheet 4.

O. B. PECK.
CENTRIFUGAL ORE SEPARATOR.

No. 489,197. Patented Jan. 3, 1893.

Witnesses:
Chas E Taylor
Clifford A White

Inventor:
Orrin B. Peck,
By Banning & Banning & Payson,
Attys

UNITED STATES PATENT OFFICE.

ORRIN B. PECK, OF CHICAGO, ILLINOIS, ASSIGNOR TO MELINDA PECK, OF SAME PLACE.

CENTRIFUGAL ORE-SEPARATOR.

SPECIFICATION forming part of Letters Patent No. 489,197, dated January 3, 1893.

Application filed April 24, 1891. Serial No. 390,325. (No model.)

*To all whom it may concern:*

Be it known that I, ORRIN B. PECK, a citizen of the United States, residing at Chicago, Cook county, Illinois, have invented certain new and useful Improvements in Centrifugal Ore-Separators, of which the following is a specification.

In operating machinery of this class I have found that it is desirable to keep the particles of material while being treated constantly submerged, and to maintain a constant water pressure upon the surface of the accumulated material and the object of my invention is to provide means for the introduction and discharge of the liquid and material treated in such manner as to maintain a constantly submerged state under pressure of said material being treated, and to precipitate the particles introduced in the vessel at a point as near the bottom of the revoluble vessel or the point where they are introduced as practicable, and my invention consists in the features and details of construction hereinafter described and claimed.

Figure 1:
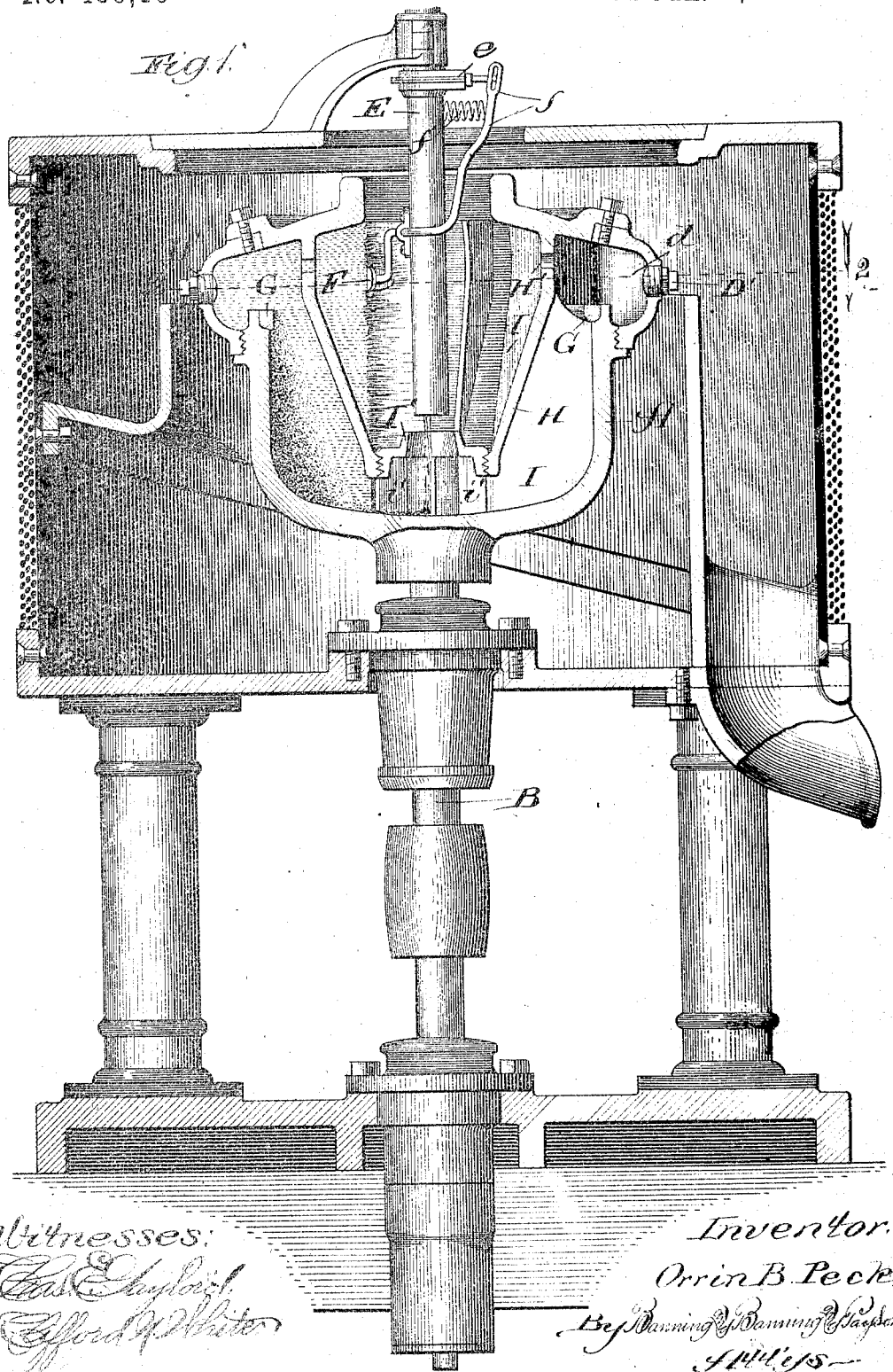
Figure 2:
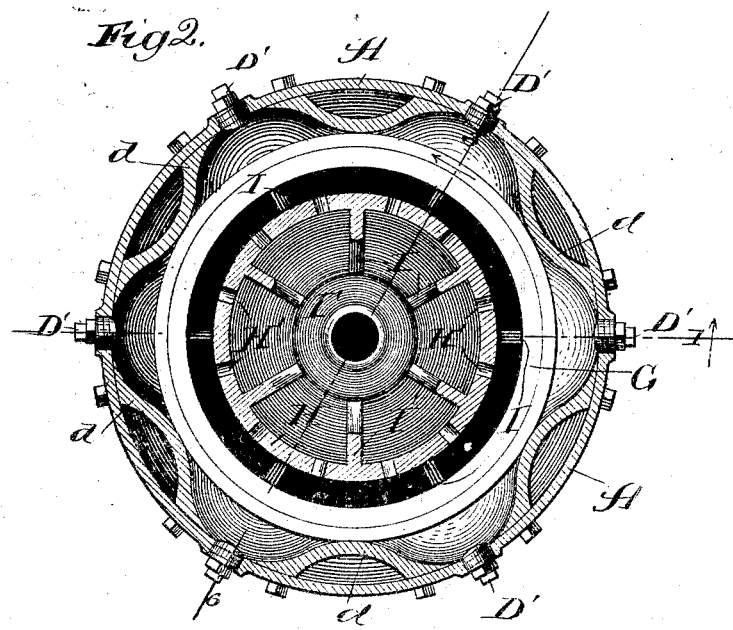
Figure 6:
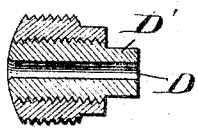
Figure 7:
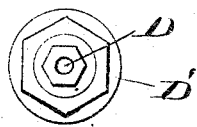
Figures 3, 4:
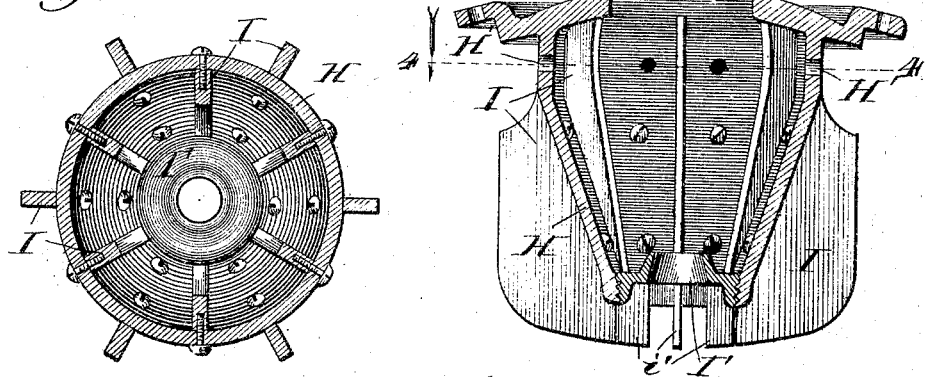
Figure 5:
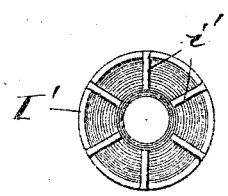
Figure 8:
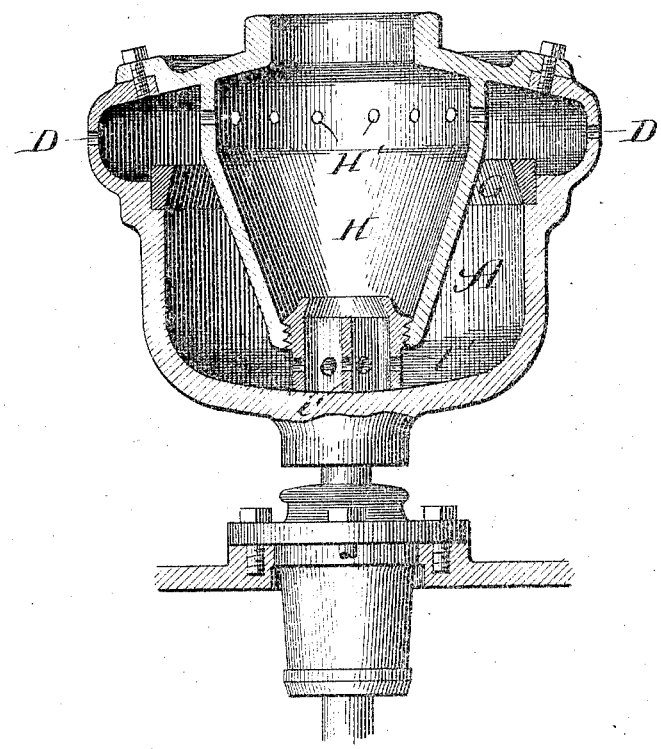
Figure 9:
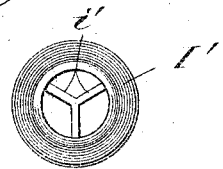
Figure 10:
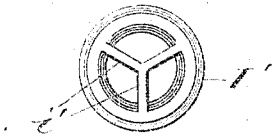
Figure 11:
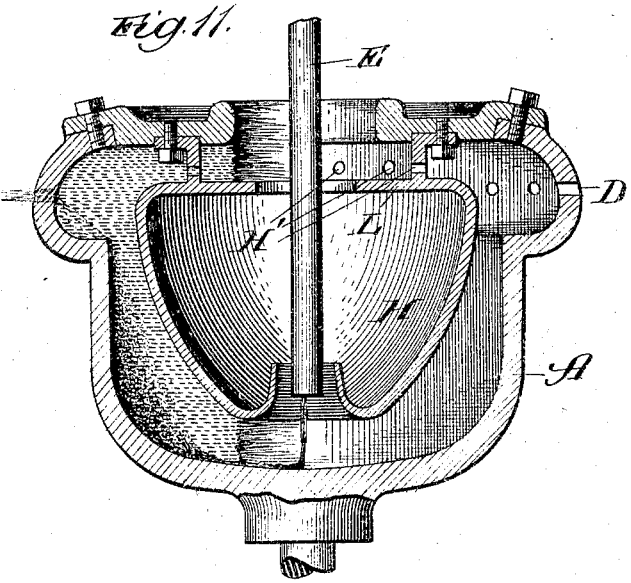
Figure 12:
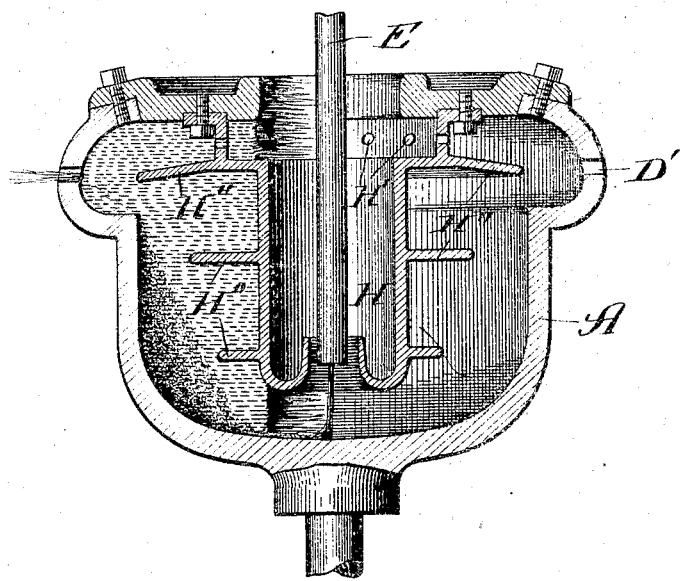

In the drawings Figure 1 is a vertical, central section of a machine provided with my improvements taken in line 1 of Fig. 2, looking in the direction of the arrow; Fig. 2 a cross-section of the revoluble vessel on line 2 2 of Fig. 1, looking in the direction of the arrows; Fig. 3 a vertical section of a portion of the revoluble vessel taken in line 3 of Fig. 2, looking in the direction of the arrow; Fig. 4 a section on line 4 4 of Fig. 3, looking in the direction of the arrows; Fig. 5 a plan view of the distributer; Fig. 6 a cross-section taken in line 6 of Fig. 2 looking in the direction of the arrow; and Fig. 7 an elevation of one of the plugs or dies containing one of the discharge orifices or openings; Fig. 8 a vertical section of a revoluble vessel illustrating a modification of my invention; Figs. 9 and 10 are respectively a plan and bottom view of a modified form of distributer; and Figs. 11 and 12 are vertical sections illustrating modified forms of constructing the revoluble vessel and its interior parts.

In treating powdered or finely divided materials or substances containing metallic or mineral-bearing particles by the action of centrifugal force in a revolving vessel for the separation of the heavier particles, as has been explained in my United States Letters Patent Nos. 444,614, 444,615, 444,619, while the material is being treated in the revolving vessel the heavier particles lodge and accumulate on the interior surface of the accumulated and accumulating deposit or mass of material retained in the vessel, while the lighter particles or portions of the material pass on over the surface of such accumulated mass to the points of discharge, and are thrown off or discharged by the action of centrifugal force. I have found that during this operation it is usually desirable or advantageous to use water with the material while being so treated, and that while the material being treated together with the water mixed with it is passing up over the surface of the accumulated mass in the vessel, from the point where it is introduced or first acted upon as above explained, it tends to cut or wash channels or grooves in the surface of the accumulated mass in the vessel, which prevent an effective separation of the heavier particles, and often cause portions of the mass of heavier particles that have already accumulated in the vessel to be washed or carried away, discharged and lost. This erosion or washing of channels in the surface of the accumulated material in the vessel is caused mainly by the water that is introduced into the vessel passing very rapidly over its surface in a thin or very shallow layer or sheet. To avoid this difficulty I find it desirable or necessary to construct a vessel that will hold a quantity of water or other liquid in a way to submerge the surface of the accumulated material in the vessel, and also the material being introduced and treated. To accomplish this and effect a continual discharge of the lighter material during the progressive and continued treatment or operation I find it necessary to provide means for the discharge of the lighter material under and beneath the surface of the water; and to maintain the submerged condition of the material I find it desirable to provide means for regulating the flow of the water and material into the vessel. It will be understood that the particles of material are separated after they have been precipitated from the water or other liquid on the surface of the accumulated material and while they are passing over such surface to the point of discharge, and, therefore, it will be evident that the closer they are precipitated to that part of the vessel which is farthest from the discharge orifices, the greater will be the distance the particles will have to travel, and the more thorough and complete their separation; and, therefore, I provide means for facilitating the precipitation of the particles as soon as possible after their introduction into the vessel.

In making my improved machine I provide a suitable revoluble vessel A. This vessel is mounted upon a suitable shaft B, by means whereof it is supported and revolved, and is preferably surrounded by a curb C. This vessel is preferably enlarged or extended around the top, or at the points where the discharge orifices or openings are located, as shown in the drawings. It is further provided with discharge orifices or openings D, which I prefer to form by means of inserting a threaded or otherwise suitably secured plug or die D' at the proper points, said plug or die having a discharge hole or orifice of the desired size, as shown in Figs. 1, 2, 6 and 7. I prefer, as shown, to make and connect these plugs or dies in a manner so as to be readily removed and replaced when sufficiently worn to make their renewal desirable. To assist in guiding the material to be discharged, to the discharge orifices, facilitating its discharge, and preventing an accumulation unevenly around the vessel in the plane of the discharge orifices, which would cause an uneven load in the vessel and a consequent vibration in its revolution, I prefer to provide the vessel with guide plates or strips d, particularly shown in Fig. 2. These plates or strips may be varied in form and size to fit the vessel in which they are to be used, but I prefer to use them as shown, placing them in an enlarged portion of a vessel thereby forming pockets or chambers receding from the axis of revolution of the vessel and to, or towards the discharge orifices. These plates if made removable may be removed and replaced when worn out.

The water or other liquid and material to be treated may be introduced into the vessel by means of a pipe or other passage E, having a valve e, or equivalent device, by means whereof the flow of water and material may be regulated. I then provide a float F, or other equivalent device adapted to ride upon the surface of the water in the vessel, preferably as shown in Fig. 1 and connected with the stem of the valve e, by means of any suitable connection as a lever f. If the amount of the water being discharged from the vessel should at any time exceed the amount being introduced, the wall or surface of the water in the vessel would begin to recede or approach the side of the vessel, and the float F which is kept in contact with such surface by a spring f', or other suitable means will move, following the receding surface of the water, and through its connection with the valve e, will further open the latter and allow the introduction of an increased amount of water. As the amount of water in the vessel increases the float will be moved back by such water moving the valve to decrease the amount of opening therein and consequently diminish the amount of water being introduced into the vessel. In this way the admission of the water is automatically controlled by the water in the vessel and a practically constant quantity of water is maintained therein. The inflow of the material to be treated may be regulated in like manner either together with the water, or independently thereof as desired.

While operating the machine it is desirable at all times to maintain a constant accumulation or layer of the particles in the vessel. Such layer at all times covering such portions of the vessel as are passed over by the material being separated, so that such material shall at all times have an accumulated layer over which to pass while moving from the point of its precipitation to the discharge orifices. To cause the formation of such a layer or accumulation, and to assist in directing the particles toward the discharge orifices, I provide the vessel with a shoulder near the discharge orifices which I prefer to form by means of a removable ring G, which extends as shown in Fig. 1 into the vessel a short distance to form the shoulder against which a portion of the material lodges, causing a layer in the vessel to immediately be accumulated; the shoulder or ring being made of hard material tends to prevent the water and material while passing over the accumulated layer to the discharge orifices from forming grooves or channels in such layer. This ring is preferably located in the vessel so that as the particles to be discharged pass over it they are directed out in a plane near that of the discharge orifices, so that the ring serves as a guide together with the plates or strips d, to direct and guide the material to such orifices. Inasmuch as the wear upon this shoulder is great, as above stated I preferably make it in the form of a removable ring so that as it becomes worn it may be taken out and replaced. I further preferably provide the vessel with a partition or lining H, which may be made in the form shown in Fig. 1. This partition may be provided with an opening to allow the proper introduction of the material into the vessel and behind the partition from which point of introduction of the water and material the partition preferably extends out and toward the points of discharge and sufficiently near to the side of the vessel to deflect or guide the material and water being introduced beneath the surface of the water in the vessel that is being revolved and maintained under pressure as and for the purposes hereinafter explained. This partition may be provided with one or more openings H', communicating with the space between the outside of the partition H, and the surrounding wall of the vessel. Through these openings when so provided, a portion of the water entering the vessel passes inside of the partition where a greater or less quantity constantly remains and revolves with the vessel, by reason of which, centrifugal force is developed and a consequent pressure is exerted through the holes H' and upon the water in the surrounding space in the vessel outside of the lining. The water within the partition revolves constantly as above stated, and is unaffected by the water and material which are being introduced into the vessel. In order for the water and material being introduced to reach the discharge orifices and be discharged, it is necessary for it to pass through the space outside, or back of the lining, which space is already filled with water and maintained under pressure caused by centrifugal force developed by its rotation, and the constant pressure exerted by the water inside of the vessel on account of the rapid rotation with the vessel, and to enable the water and material to pass through this space, under the pressure and to the point of discharge, it is necessary for it to first acquire a sufficiently rapid revolution to develop such a degree of centrifugal force as will drive or carry it up through the already revolving water in this space. This rapid rotation necessarily acquired by the water and material, before it can pass or be driven up, or far from the point of their introduction, facilitates the precipitation of the particles of material at a point near where they are introduced into the vessel, and in consequence a more complete and rapid separation is secured.

To further assist in imparting and maintaining a rapid revolution of the water and material I prefer to provide one or more wings I. These wings may be attached to the outside of the partition or to the inside thereof, or both to the inside and outside, as may be desired, and are made of suitable form and dimensions to enable them to accomplish the object for which they are devised. They may be made integral with the partition or detachably connected to it, as desired. I further prefer to provide the partition with a distributer I', preferably of the form shown more particularly in Fig. 5, and to be detachably secured to the partition at the point through which it is intended to introduce the material and water. This distributer is preferably provided with a central chamber, into which the material or water is first received, and a number of wings or partitions i', which serve to rapidly drive and direct the water and material toward the sides of the vessel, and behind or back of the lining, and thereby quickly and thoroughly distribute the same. In Figs. 8, 9 and 10 I have illustrated modified forms in which this distributer may be made, the purpose and principle of operation being the same in all of them.

In Fig. 8 I have illustrated a modified form of a vessel. In this form the wings I, and removable orifices D are dispensed with, and the form of the ring G, and lining or partition H are somewhat altered.

In Fig. 11 I have shown another modification of this form. The partition or lining H is provided with a flange h, extending a suitable distance toward the center of the vessel and which prevents the water from entering the inner vessel formed by the partition. The openings H' in the partitions are located above this flange as shown.

In Fig. 12 I have shown still another modification wherein the shape of the inner partition or lining is modified and such lining is provided upon its exterior with one or more deflectors $H^2$, preferably increasing in diameter from the point of the introduction toward the point of discharge of the material. By means of these deflectors the water and material are prevented from rising directly from the point of their introduction, and are deflected and directed toward the side of the vessel. It will be seen that by means of this construction in order for the water and material to pass upward by these deflectors and toward the discharge orifices it will be necessary for a high rate of speed to be imparted to them, for the reasons explained in describing Fig. 1, and this speed, as above stated, will facilitate the precipitation of the particles at a point near their place of introduction into the vessel.

While I have spoken of a partition or lining, the feature of this part of my invention consists in providing means for guiding or deflecting the water and material, being introduced beneath the surface of the water, revolving with and under pressure in the vessel, in such manner as to rapidly precipitate the particles at a place as near as possible to their point of introduction into the vessel.

I claim:

1. In centrifugal ore separators, a revoluble vessel adapted to hold a body of water, and provided with means for deflecting or guiding the water and the material being introduced and treated to a point beneath the surface of the revolving body of water in the vessel, substantially as described.

2. In centrifugal ore separators, a revoluble vessel adapted to hold a body of water, and provided with an inner partition or lining for deflecting or guiding the water and the material being treated to a point beneath the surface of the revolving body of water in the vessel, substantially as described.

3. In centrifugal ore separators, a revoluble vessel provided with an inner partition or lining for deflecting or guiding the water and the material being treated to a point beneath the surface of the revolving body of water in the vessel, and with a distributer to receive and distribute the water and material, and wings to assist in carrying them around as the vessel revolves, substantially as described.

4. In centrifugal ore separators, the combination of a revoluble vessel having discharge openings beneath the surface of the water, and means comprising valve mechanism actuated by the lateral pressure of the water in the vessel for regulating the inflow of the water to the vessel by the outflow through the discharge openings, substantially as described.

5. In centrifugal ore separators, the combination of a revoluble vessel having discharge openings beneath the surface of the water, a float and valve mechanism operated by the float for regulating the inflow of the water to the vessel by the outflow through the discharge openings, substantially as described.

6. In centrifugal ore separators, a revoluble vessel provided with discharge openings beneath the surface of the water, and with a ring and plates or guides to direct the material to the discharge openings, substantially as described.

7. In a machine for the centrifugal treatment of powdered or finely divided substances for the separation of metallic or mineral-bearing particles, a revoluble vessel provided with pockets or recesses around its diameter extending in a direction from the axis of revolution outward, the pockets having discharge openings beneath the surface of the water, substantially as described.

ORRIN B. PECK.

Witnesses:
THOMAS A. BANNING,
SAMUEL E. HIBBEN.